(12) United States Patent
Liva et al.

(10) Patent No.: US 7,003,690 B2
(45) Date of Patent: Feb. 21, 2006

(54) METHOD AND APPARATUS FOR REDUNDANCY SWITCHING IN LINE CARDS

(75) Inventors: Valentino Liva, Los Altos, CA (US); Isaac Wingfield, Los Gatos, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 513 days.

(21) Appl. No.: 10/099,470

(22) Filed: Mar. 12, 2002

(65) Prior Publication Data

US 2002/0179720 A1    Dec. 5, 2002

Related U.S. Application Data

(60) Provisional application No. 60/294,656, filed on May 30, 2001.

(51) Int. Cl.
*G06F 11/00* (2006.01)
(52) U.S. Cl. .............. 714/9; 714/4; 714/5; 710/38; 710/110; 710/300; 710/301
(58) Field of Classification Search .......... 714/3, 714/4, 43; 370/217, 219
See application file for complete search history.

(56) References Cited

U.S. PATENT DOCUMENTS

| | | | | |
|---|---|---|---|---|
| 5,596,569 A | * | 1/1997 | Madonna et al. | 370/217 |
| 5,935,244 A | * | 8/1999 | Swamy et al. | 713/200 |
| 6,052,045 A | * | 4/2000 | Martich | 335/151 |
| 6,137,793 A | * | 10/2000 | Gorman et al. | 370/360 |
| 6,744,779 B1 | * | 6/2004 | Yamaguchi et al. | 370/449 |
| 2002/0038461 A1 | * | 3/2002 | White et al. | 725/129 |

* cited by examiner

*Primary Examiner*—Robert Beausoliel
*Assistant Examiner*—Timothy M. Bonura
(74) *Attorney, Agent, or Firm*—Harrity Snyder LLP (57) ABSTRACT

A system for redundancy switching of line cards in a communications system. When a line card needs to be replaced or serviced or becomes inoperable, signal traffic is switched to and through a redundant line card. This is achieved by implementing a switching fabric on I/O cards, where the I/O cards carry signal traffic to and from line cards. The switching fabric enables traffic to and from an I/O card servicing the line card to be replaced to instead service the redundant line card.

25 Claims, 10 Drawing Sheets

FIGURE 9 ns systems. More particularly, the present invention is
METHOD AND APPARATUS FOR REDUNDANCY SWITCHING IN LINE CARDS

RELATED APPLICATIONS

This application claims priority from provisional patent application No. 60/294,656, en titled "I/O Card" filed on May 30, 2001.

FIELD OF THE INVENTION

The present invention relates to broadband communications systems. More particularly, the present invention is directed to line cards in devices which implement broadband communication systems.

BACKGROUND

Figure 1:
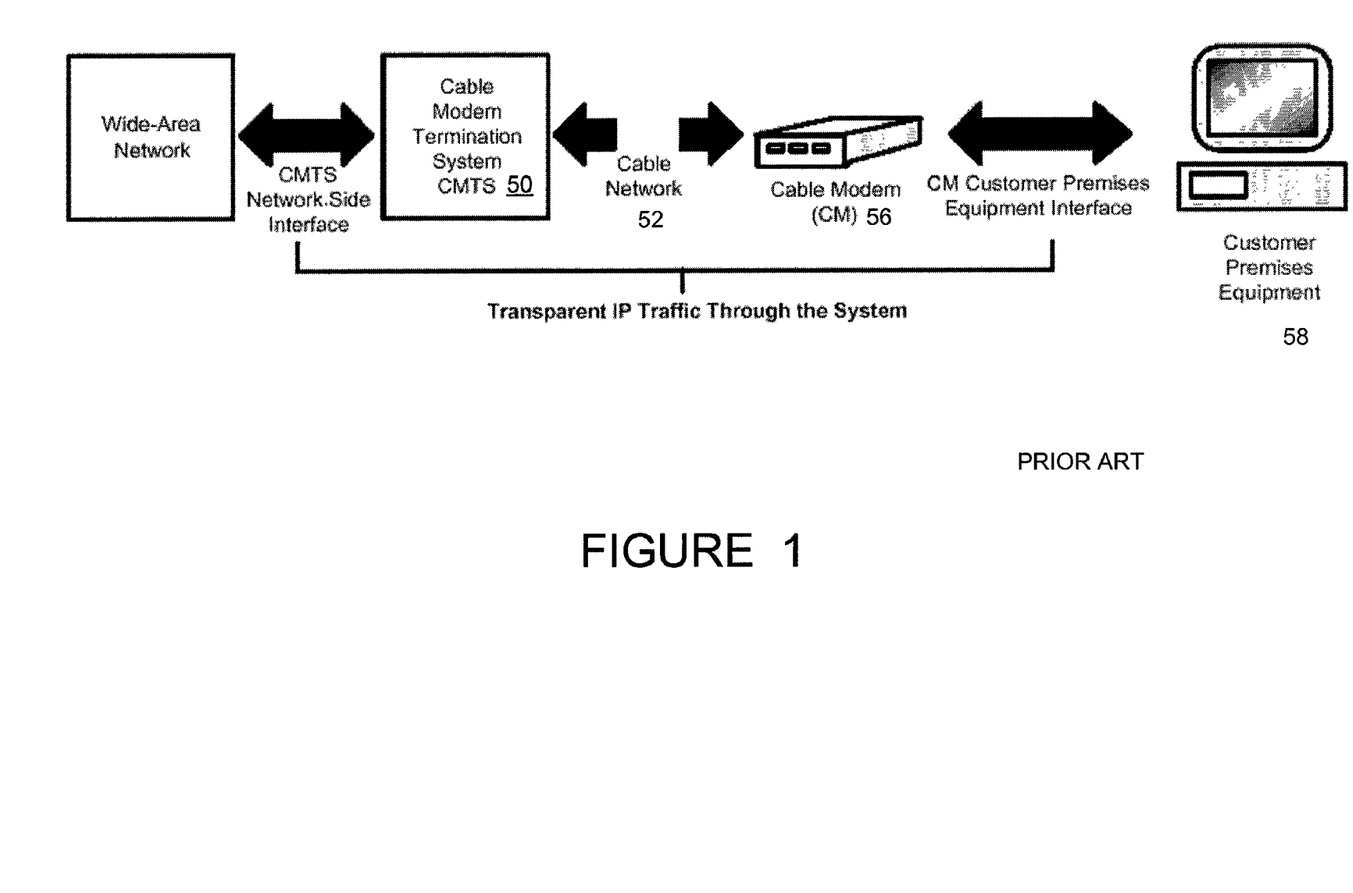
FIG. 1 illustrates a simplified diagram of a conventional cable modem system.

Broadband communication systems such as cable modem systems offer users access to fast, high-bandwidth networks. FIG. 1 illustrates a simplified diagram of a conventional cable modem system. The DOCSIS (Data Over Cable Service Interface Specifications) Radio Frequency Interface Specification specifies the transfer of IP traffic, between the cable headend system and customer locations, over an all-coaxial or a hybrid-fiber/coax (HFC) cable network 52. The transmission path over the cable system is realized at the headend by a Cable Modem Termination System (CMTS) 50 and at each customer location by a Cable Modem (CM) 56. The CMTS 50 interfaces the customer with the wide-area network or even metropolitan area network beyond. The DOCSIS standard defines a single transmitter for each downstream channel—the CMTS 50. All CMs 56 listen to all frames transmitted on the downstream channel upon which they are registered and accept those where the destinations match the CM 56 itself or CPEs (Customer Premises Equipment) 58 connected. CMs 56 can communicate with other CMs 56 only through the CMTS 50.

Figure 2:
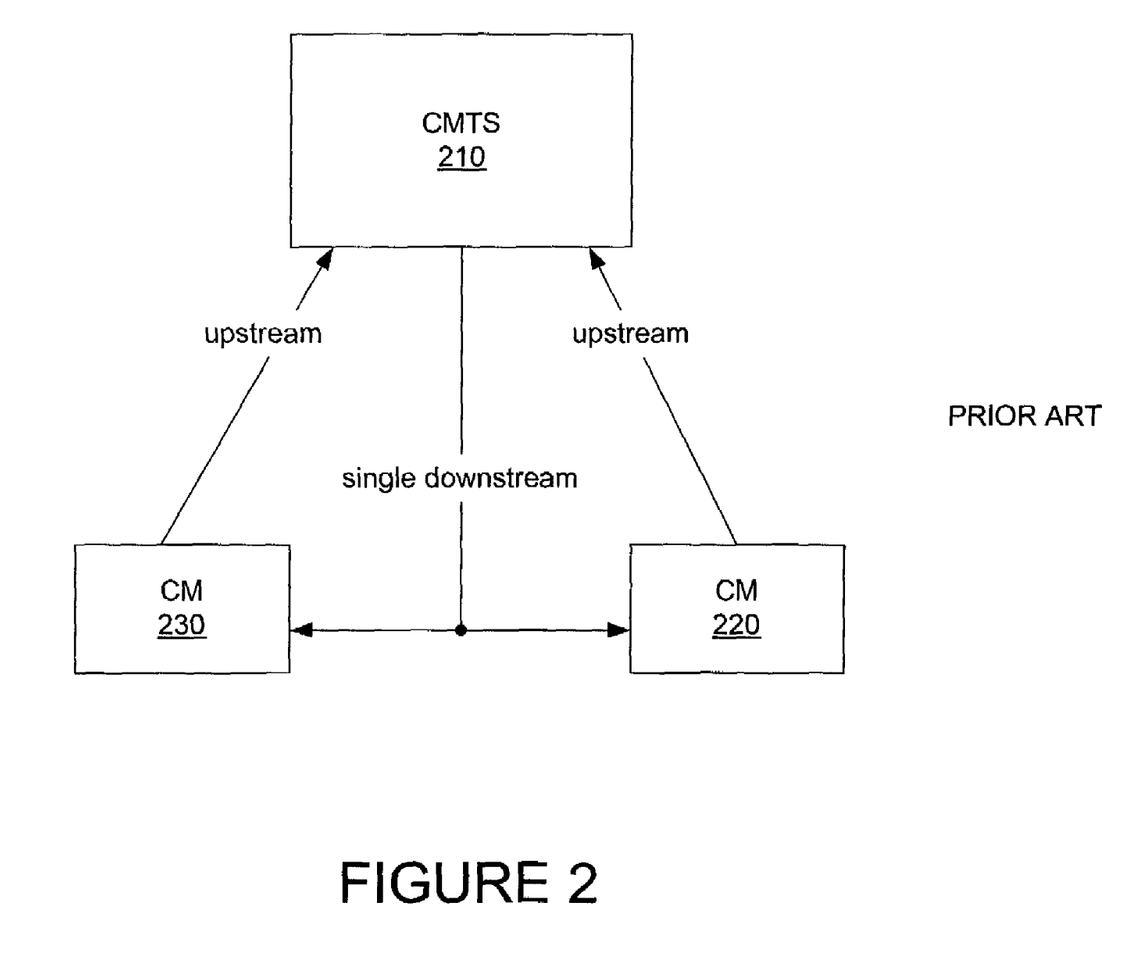
FIG. 2 illustrates a system with two cable modems serviced by a single CTMS.

The upstream channel is characterized by many transmitters (i.e. CMs 56) and one receiver (i.e. located within the CMTS 50). Consider the case of two cable modems (CMs) that belong to different cable segments communicating with a single Cable Modem Termination System (CMTS) illustrated in FIG. 2. In the conventional cable modem system operation, each cable modem CM 230 and CM 220 would share a single downstream path to obtain data/signals from the CMTS 210. Also, each cable modem CM 230 and CM 220 has its own upstream path to send data/signals to the CMTS 210. Thus, two upstream frequencies (or one FDMA (Frequency Division Multiplexing) upstream frequency) and one downstream frequency is used by the system of FIG. 2. The CMTS would have a logical port for each CM 230 and CM 220 for the upstream traffic thereto, while having only one port for downstream traffic to both CM 230 and CM 220.

Figure 3:
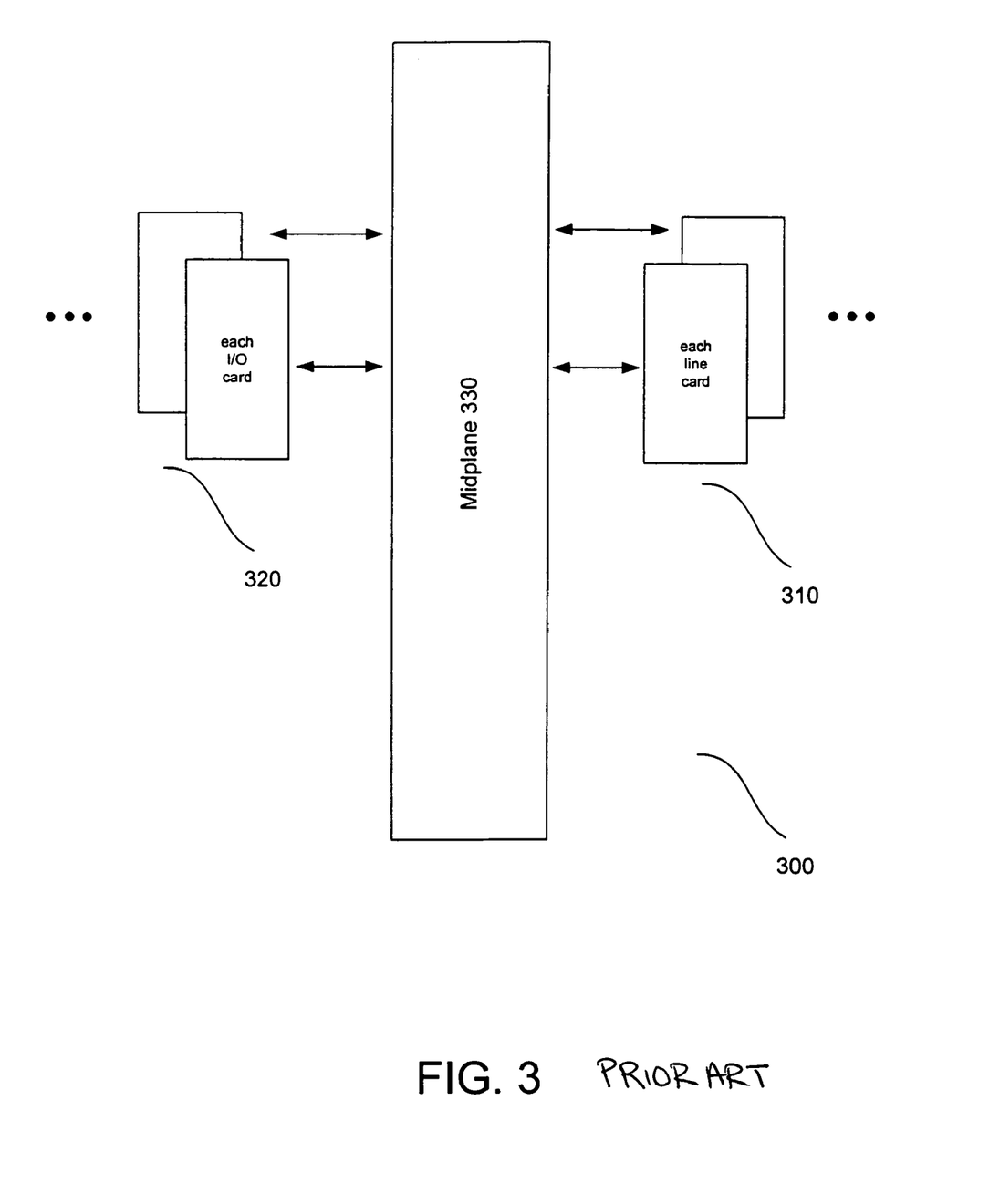
FIG. 3 is an architecture overview of one such CMTS.

Each CMTS consists of a number of cards of different function coupled together by a midplane. FIG. 3 is an architecture overview of one such CMTS. CMTS 300 has a plurality of line cards 310 (one or two slots wide), which perform the bulk of DOCSIS processing functions, are electrically connected via connectors or other mechanism to a midplane 330. In this example, each of the line cards 310 can support up to 4 downstream channels and 16 upstream channels as well as a number of video channels. Each of the line cards 310 also has a number of connectors to the midplane 330. Each of the line cards 310 has associated with it an I/O card from a group of I/O cards 320. Each of the I/O cards 320 mounts directly behind each line card on the other side of the midplane 330. Each of the I/O cards 320 accepts coaxial cable connections which provide the primary physical layer for cable modem traffic, upstream and downstream. One major problem with such a configuration is the breakdown of one of the line cards, which would necessitate physical repair and reconnect.

To increase the reliability of such a configuration, conventional systems have used coaxial relays in a matrix configuration. These are very expensive, and further, are bulky and cumbersome forcing a matrix design that must be external to the case that packages the CMTS. Further servicing such a system is prohibitive and may lead to a discontinuation in service.

Thus, there is a need for a more effective apparatus to increase the reliability of line cards without the costs associated with a matrix relay.

SUMMARY OF THE INVENTION

A system for redundancy switching of line cards in a communications system is disclosed. When a line card needs to be replaced or serviced or becomes inoperable, signal traffic is switched to and through a redundant line card. This is achieved by implementing a switching fabric on the I/O cards, where the I/O cards carry signal traffic to and from the line cards. The switching fabric enables traffic to and from an I/O card servicing the line card to be replaced to instead service the redundant line card.

DETAILED DESCRIPTION OF THE INVENTION

In brief, the invention is directed to a method and apparatus for switching of failed line cards to redundant line cards. One or more redundant line cards are provided as a backup for the primary (or in operation) line cards. In describing the various embodiments of the invention, references made to "primary line cards" will also be understood to mean line cards which may be operating even though they were not designated as primary. Traffic intended for a line card that is detected as out-of-service is re-routed by a number of different mechanisms to a redundant line card. The mechanisms for re-routing traffic include direct interconnection between cards and routing via equivalent coaxial connection through the midplane. Such mechanisms are provided either on or with respect to the I/O card associated with each primary/redundant line card pair. RF connections to the I/O card associated with the primary line card are thus "switched" so that they can reach the destination redundant line card in case of failure of a primary line card.

Figure 4:
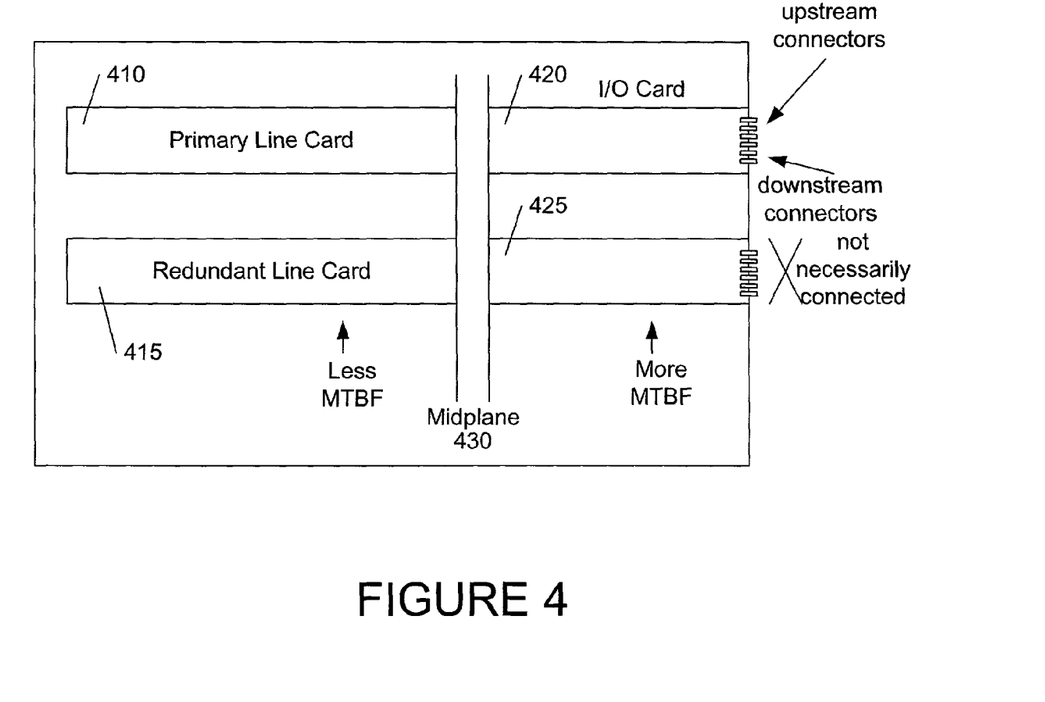
FIG. 4 illustrates the general layout of redundant line card architecture according to one or more embodiments of the invention.

FIG. 4 illustrates the general layout of redundant line card architecture according to one or more embodiments of the invention. A primary line card 410 occupies two slots of the CMTS and is connected to the midplane 430 via a set of connectors (not shown). Directly behind the primary line card 410 is a primary I/O card 420. Each primary I/O card 420 is associated with an additional I/O card 425. The primary I/O card 420 and additional I/O card 425 implement redundancy switching according to one or more embodiments of the invention. The primary I/O card 420 re-routes RF traffic destined for the primary line card 410 through the additional I/O card 425 to a redundant line card 415 in case the primary line card 410 experiences failure or other defect. Ways of connecting the primary I/O card 420 and the additional I/O card 425 is to use card-to-card jumpers, or as described below, by connecting them through traces on the midplane 430. Likewise, the primary I/O card 420 accepts RF traffic from redundant line card 415 instead of primary line card 410 in case the primary line card 410 experiences failure or other defect. This can also be achieved by connecting the additional I/O card 425 to the primary I/O card 420 by jumpers or through the midplane 430. The interconnects between additional I/O card 425 and primary I/O card 420 may be by way of miniature cables and surface-mount connectors with multiple "flying-leads" between the two cards. In variations of this, miniature multi-pin coaxial connectors and/or multi-coaxial "flat cables" may be employed to reduce the number of flying leads and individual connectors.

The control of the switching between primary line card 410 and redundant line card 415 may be implemented by other command and control modules within the CTMS which send switching signals along the midplane 430. For instance, an "RF present" signal (or the logical complement, "RF absent") may be derived from each downstream signal path and read by the control module(s). The RF present (or absent) indicator needs only to indicate whether an RF signal is present or not present and need not determine its power with any accuracy.

In one embodiment, each primary I/O card 420 supports 4 physical upstream RF connections and 4 physical downstream RF connections made by accepting coaxial or similar cable. Each of the 4 physical upstream connections multiplex a number of virtual upstream traffic channels. The primary I/O card 420 has upstream and downstream connectors on the back side (opposite to the midplane) which provide the CTMS the connectivity with its cable modem subscribers. Likewise, the additional I/O card 425 can be built to have such a set of upstream and downstream connectors, but these can be left inactive so that the primary I/O card 420 handles the I/O functions upstream and downstream with the cable modem population serviced by the CTMS. In other words, all cables may remain physically attached to the I/O card 420, thus avoiding service discontinuity.

The additional I/O card 425 is therefore a "pass-through" mechanism which enables routing of traffic to and from the redundant line card 415 instead of primary line card 410. This allows the system to be fully functional while a failed primary line card 410 is being replaced by a new working line card. It also assumes that the mean-time-between-failure of the primary I/O card 420 and additional I/O card 425 is at least many times longer than that of the line cards 410 and 415. Both additional I/O card 425 and primary I/O card 420 could be identically built with the exception that additional I/O card 425 is not necessarily connected to the outside world. This would simplify the cost, testing and deployment associated with building a redundant system, while reducing the number of spares to keep in inventory.

Figure 5:
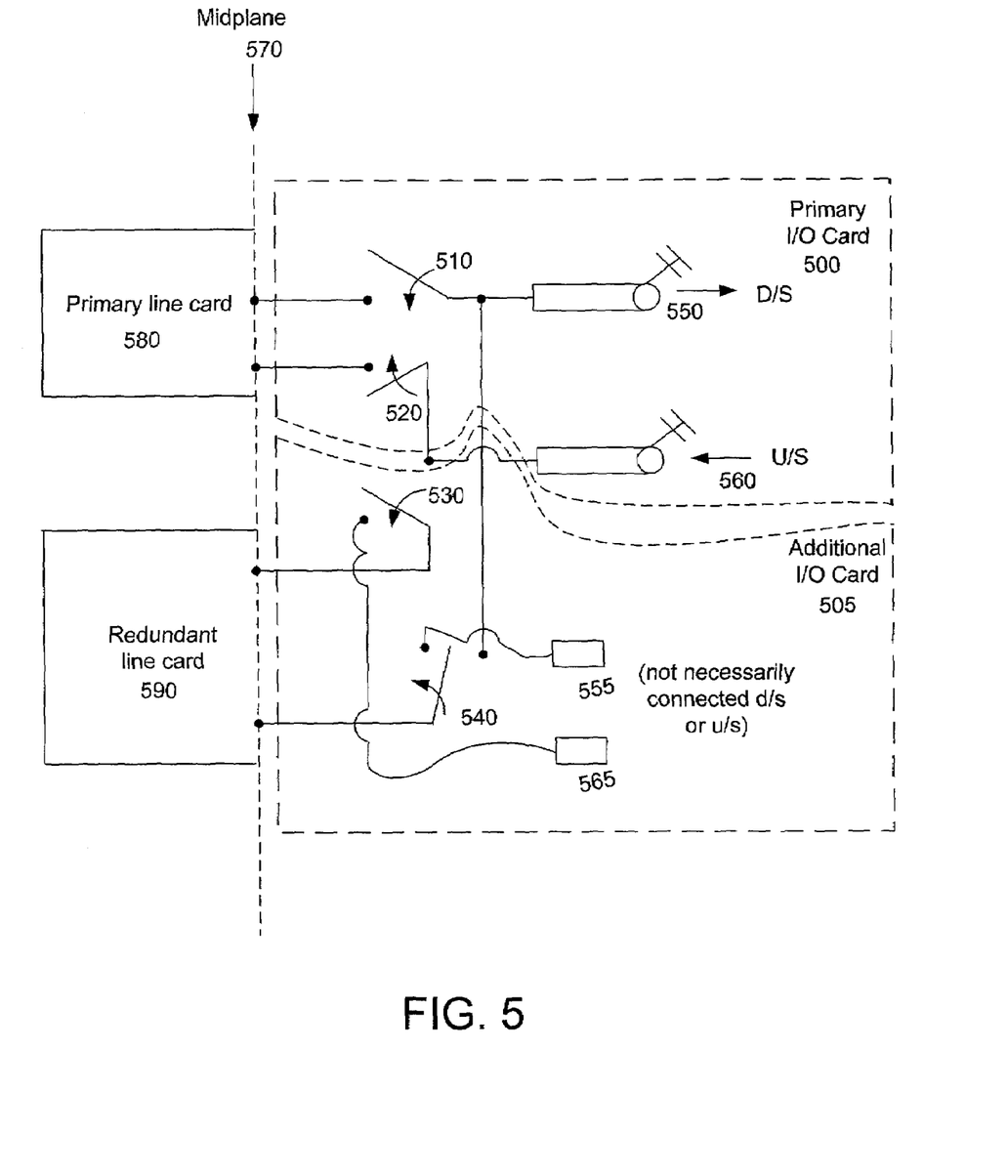
FIG. 5 shows a redundancy switch-over circuitry distributed upon an I/O card and an additional I/O card.

Each of the 4 pairs of upstream and downstream RF connections could have a redundancy switching configuration (either logical or physical) as shown in FIG. 5. The circuit of FIG. 5 would be reproduced for every pair of upstream/downstream physical connections which in this case is 4. FIG. 5 shows a redundancy switch-over circuitry distributed upon primary I/O card 500 and additional I/O card 505 and servicing traffic through a primary line card 580 and, when failing, a redundant line card 590. The pair of downstream and upstream connectors 550 and 560, respectively, extending from primary I/O card 500 are active at all times. However, the pair of downstream and upstream connectors 555 and 565, respectively, which extend from additional I/O card 505, are inactive (null) and thus not connected downstream or upstream to subscribers at any time. When the primary line card 580 is functioning properly, the redundant line card 590 would not receive/transmit or process any signals and may be placed in stand-by mode.

When the primary line card 580 is operational (in accordance with whatever the allowable specification calls for) switch 510 would remain in a closed position. This would allow downstream traffic to directly pass via midplane 570 from the primary line card 580 through downstream connector 550 and out to subscribers. At the same time, while switch 510 is closed, switch 540 is in a position such that the null downstream connector 555 is coupled to redundant line card 590. Likewise, switch 520 would remain closed while primary line card 580 is operational. This would allow upstream traffic to flow from subscribers via connector 560 through the midplane 570 and on to primary line card 580. At the same time, while switch 520 is closed, switch 530 would be in a position such that the null upstream connector 565 is coupled to redundant line card 590.

If there is some failure or inoperability of primary line card 580, then the circuitry shown would switch and re-route traffic to and from redundant line card 590. In this case, the following would occur. Normally closed switch 510 would open thereby decoupling connector 550 from primary line card 580. At the same time, switch 540 would be in a position such that connector 555 would be decoupled to redundant line card 590 and connector 550 would be coupled to redundant line card 590. This switching behavior allows downstream traffic to pass from the redundant line card 590 via midplane 570 to downstream connector 550. Likewise, normally closed switch 520 would open thereby decoupling connector 560 from primary line card 580. At the same time, switch 530 would be in a position such that connector 565 would be decoupled from redundant line card 590 and connector 560 would be coupled to redundant line card 590. This switching behavior allows upstream traffic to pass from the upstream connector 560 to redundant line card 590 via midplane 570. The control of switches 510, 520, 530 and 540 may be achieved by signals sent over the midplane 570 and/or control circuitry on the I/O cards 500 and 505. The embodiments that may be referred to in FIG. 5 are by way of logical illustration. Any variety and combination of mechanical, electrical or electro-mechanical switches, relays or multiplexers may be used in implementing redundancy switching.

Figure 6:
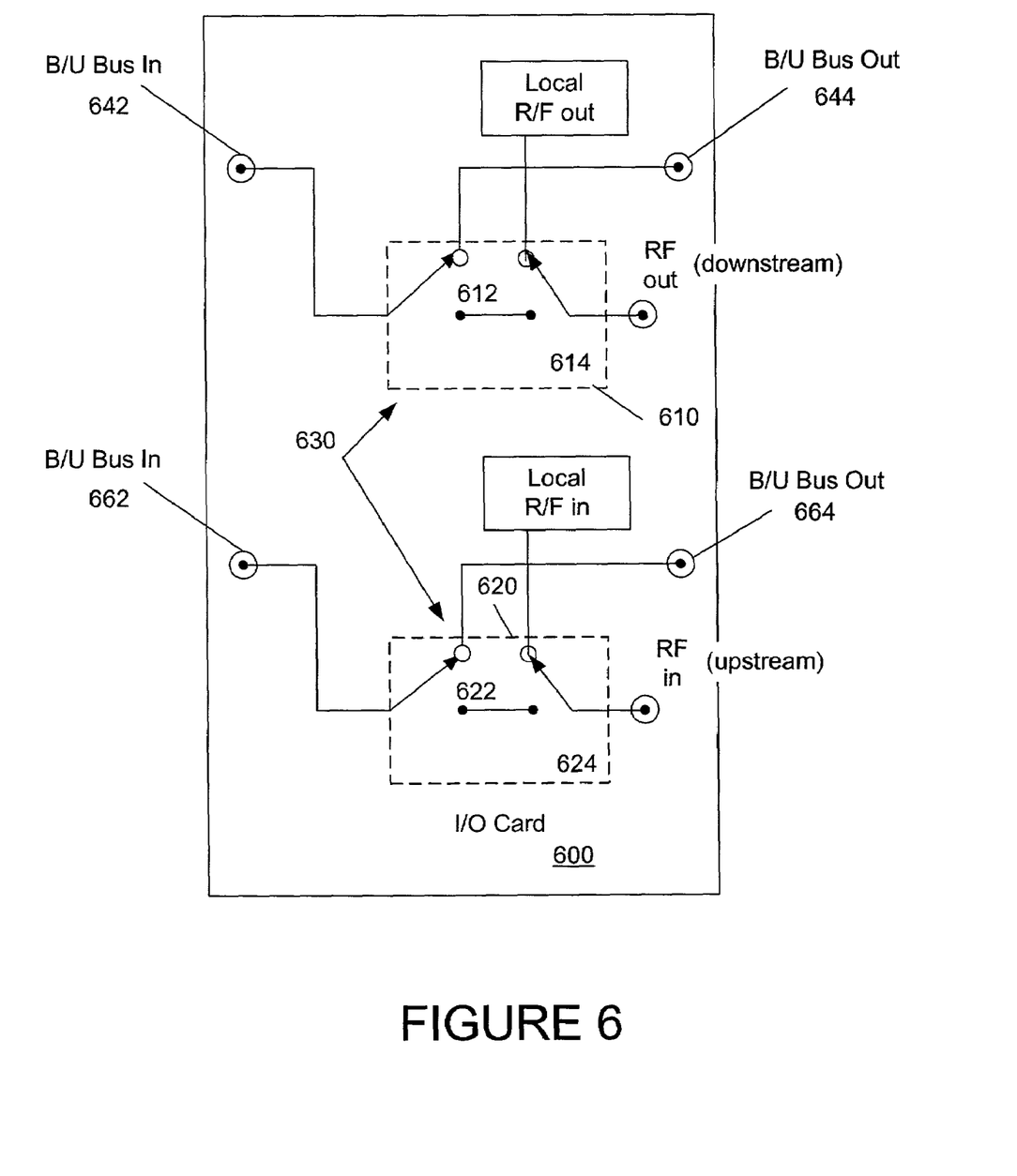
FIG. 6 illustrates redundancy switching implemented with solid state RF switches on an I/O card according to one or more embodiments of the invention.

FIG. 6 illustrates redundancy switching implemented with solid state RF switches on an I/O card according to one or more embodiments of the invention. Solid state RF switches are controllable by means of logic level signals and can provide the advantage of reduced attenuation in the RF signal path. The I/O card 600 shows only a single pair of upstream and downstream connections, but it will be appreciated that the I/O card 600 may have many such pairs of upstream and downstream connections, or alternatively, a different number of upstream compared to downstream connections.

The switches 612 and 614 form a first switching block 610 (indicated by dashed lines). Likewise, switches 622 and 624 form a second switching block 620 (indicated by dashed lines) on the same I/O card 600. The two blocks 610 and 620 comprise a switching network 630 which has the following behavior. When the primary line card is functioning properly, there may be no need for redundancy switching (unless the primary line card is to undergo maintenance in the ordinary course), and thus the switching network 630 operates in a pass-through mode. In this pass-through mode wherein the primary line card (not shown) downstream path (labeled Local RF Out) is coupled (via switch 614) directly to the downstream connector (labeled RF Out) through which traffic flows from CMTS to subscriber(s). Also, in pass through-mode, the primary line card upstream path (labeled Local RF In) is coupled (via switch 624) directly to the upstream connector (labeled RF In) through which traffic flows from the subscribers to the CMTS. In pass-through mode, the Back-up Bus (labeled B/U Bus In 642) on its downstream path also passes through to the output connector (labeled Back-up Bus Out 644) of the additional I/O card (not shown). However, since the Back-up Bus out 644 terminates in a null, non-active downstream output of the additional I/O card, no real signals are passed through the Back-up Bus In 642. Likewise, in pass-through mode, the Back-up Bus (labeled B/U Bus In 662) on its upstream path also passes through from the output connector (labeled Back-up Bus Out 664) of the additional I/O card (not shown). However, since the Back-up Bus out 664 terminates in a null, non-active upstream input of the additional I/O card, no real signals are passed through the Back-up Bus In 662.

When there is a need to utilize the redundant line card, either for maintenance or failure reasons, the switching network 630 places the I/O card 600 into a backup mode (redundancy) so that the redundant line card can be used instead of the primary line card. In back-up mode, switches 612, 614, 622 and 624 are in a state opposite to that during pass-through mode. This would isolate the primary line card on both upstream and downstream paths and have the following effect:

1) the Back-up Bus In 642 would be decoupled from the Back-up Bus Out 644 (thus disabling downstream connectivity of the redundant line card with the additional I/O card);

2) the Back-up Bus In 662 would be decoupled from the Back-up Bus Out 664 (thus disabling upstream connectivity of the redundant line card with the additional I/O card);

3) the Back-up Bus In 642 would be coupled to the RF Out (thus enabling downstream connectivity of the redundant line card with the I/O card 600); and 4) the Back-up Bus In 662 would be coupled to the RF In (thus enabling upstream connectivity of the redundant line card with the I/O card 600).

This behavior would place the redundant line card into operation and disable the primary line card. The switches 612, 614, 622 and 624 are shown as single-pole double-throw RF switches with logic-level input controls which may be implemented over the midplane by one of ordinary skill in the art. The input controls, depending upon the implementation, could be a pair of complementary input controls or a single input control for all the upstream/downstream pairs (only one pair is illustrated in FIG. 6) or separate control signals for each upstream/downstream pair. An alternate means to implement redundancy would be to use multiplexers which in essence perform the switching function by selecting signal paths as desired.

Figure 7:
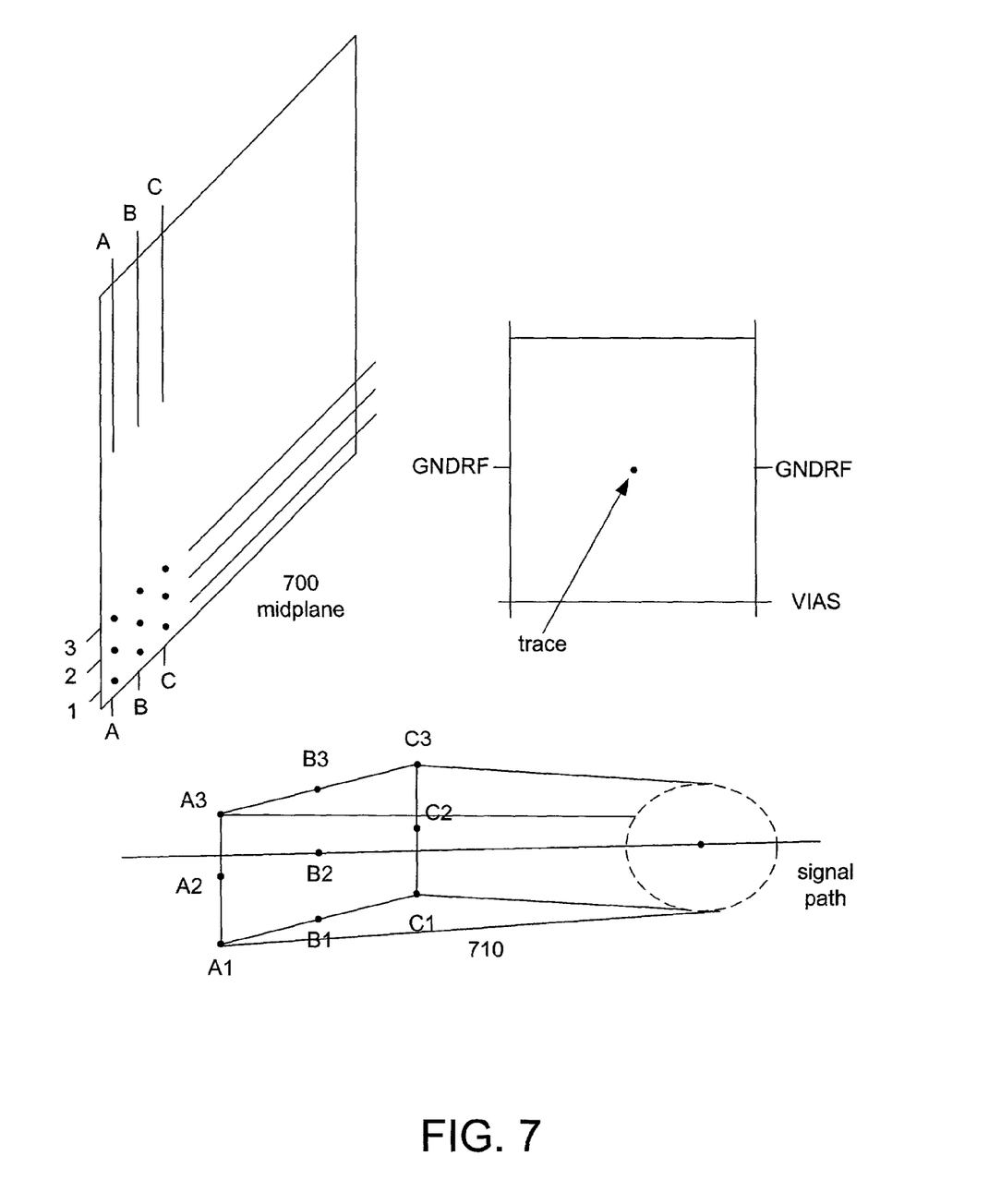
FIG. 7 illustrates how redundancy connection can be implemented through the midplane according to one or more embodiments of the invention.

FIG. 7 illustrates how redundancy connection can be implemented through the midplane according to one or more embodiments of the invention. The midplane consists of a number of connectors, with each connector having an array of pins. The pins are configured so as to simulate a coaxial cable from the pattern of several of the pins. The effect of surrounding a signal pin with grounding pins is equivalent to that of the configuration of a coaxial cable. A three-by-three array of pins in a given connector is configured so that all eight pins surrounding the center pin are RF ground pins. The center pin or wire of the array carries either upstream or downstream signals. FIG. 7 shows a cross section of a midplane-connector 710 which electrically connects an I/O card to the midplane. A 3-by-3 array of pins within connector 710 is shown and labeled A1, A2, A3, B1, B2, B3, C1, C2 and C3. In order to configure a coaxial or RF-tolerant "cable", periphery pins are all connected to ground while a center pin is connected to the upstream or downstream signal path. Hence, pin B2 would be connected to the signal path of the I/O card while pins A1, A2, A3, B1, B3, C1, C2 and C3 are all connected to ground (they provide shielding and grounding for the signal carried on pin B2).

The redundancy switching networks such as those shown in FIGS. 6 and 7 may be implemented by controlled-impedance traces on the midplane which connect each primary I/O card with one or more additional I/O cards supporting a corresponding number of redundant line cards. Other pins on such connectors to the midplane can provide the control signaling necessary to switch from pass-through mode to back-up mode and vice-a-versa as needed.

Figure 8A:
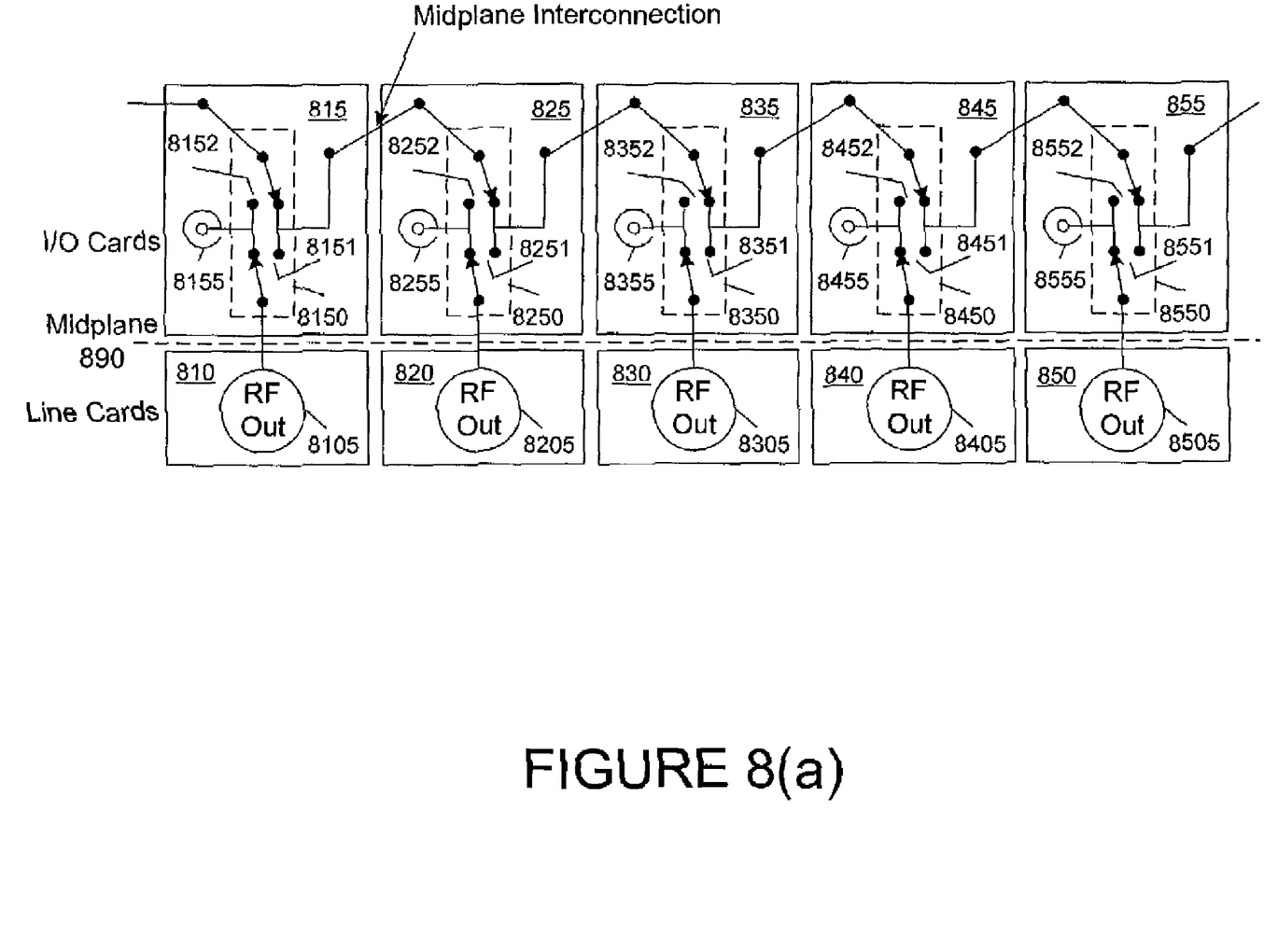
FIGS. 8(a)–8(b) illustrates a group of line cards having switchover redundancy according to one or more embodiments of the invention.
Figure 8B:
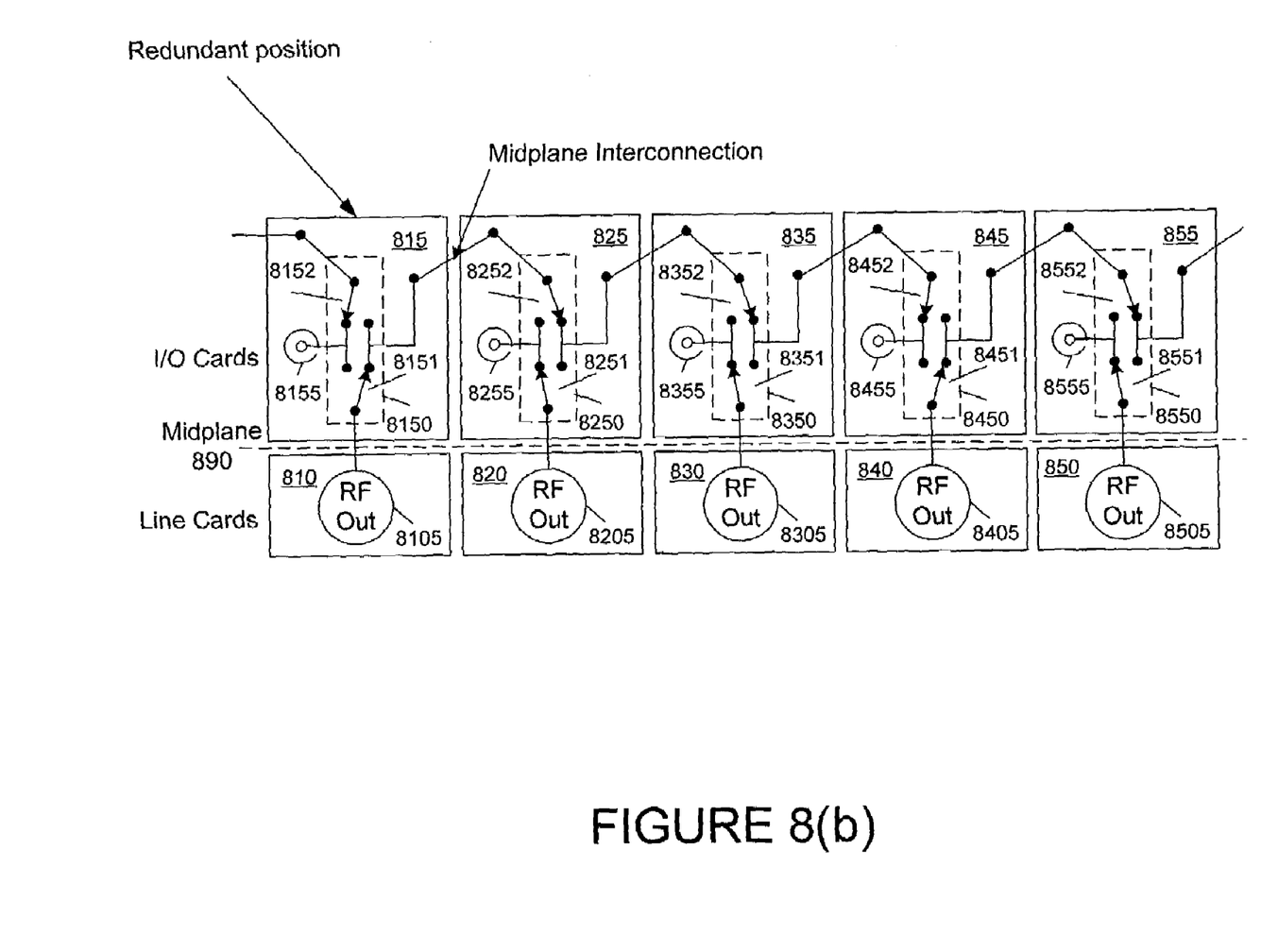

FIGS. 8(a)–8(b) illustrates a group of line cards having switchover redundancy according to one or more embodiments of the invention. The switching paradigm for redundancy enables topologies of either 1-to-1 redundancy, where each primary line card is serviced by its own dedicated redundant line card, or 1-to-N redundancy, where N primary line cards are served by a single redundant line card, or M-to-N redundancy where M primary line cards are serviced by N redundant line cards. In the exemplary topology shown in FIG. 8(a), a total of 5 line cards 810, 820, 830, 840 and 850, each with a corresponding I/O cards 815, 825, 835, 845 and 855 which are connected via the midplane. Each of the I/O cards is inter-connected in a daisy-chain configuration over the midplane. These connections which follow from one I/O card to the next can be thought of as a Back-up Bus similar to that shown and described with respect to FIG. 6. For clarity of explanation, each line card 810, 820, 830, 840 and 850 is shown with only one downstream signal path (labeled "RF Out"), but it will be readily appreciated that many upstream as well as other downstream paths may be simultaneously present on any one line card.

Assume that line card 810 is a designated backup card and that the other 4 line cards 820, 830, 840 and 850, are all "primary" line cards (i.e. with active signal traffic). Hence, initially, RF Out 8105, RF Out 8205, RF Out 8305, RF Out 8405 and RF Out 8505 are connected to connectors 8155, 8255, 8355, 8455 and 8555, respectively and all cards are in pass-through mode. In such case, switch networks 8150, 8250, 8350, 8450 and 8550 would all be in pass-through mode such that the Back-up bus passes-through all five I/O cards without any re-routing of any local traffic thereon. This state is shown in FIG. 8(*a*).

If line card 840 fails or needs to be replaced or serviced, then the state of the switching network(s) is as shown in FIG. 8(*b*). The state of switch networks 8250, 8350 and 8550 from I/O cards 825, 835, and 855, respectively, would remain unchanged. In switching network 8450, the switch 8451 would change state as shown such that RF Out 8405 on line card 840 is no longer connected to I/O card 845, but rather, to the Back-up Bus in the direction of I/O card 855. At the same time, the switch 8452 would change state as shown such that the RF connector 8455 would be connected also to the Back-up bus but in the direction towards I/O card 835. This would effectively de-couple the line card 840, which is failing, failed or needs servicing, from I/O card 845 and all other I/O cards, and thus, from the output signal traffic path.

In a simultaneous fashion, switching network 8150 from the designated-as-additional I/O card 815 would show the following behavior. Switch 8151 would change state so that the Back-up bus would terminate in the null (inactive) RF connector 8155, and also so that the downstream traffic destined for I/O card 845 is correctly sourced. At the same time, switch 8152 would also change state, coupling the Back-up bus from the direction of I/O card 825 with the RF Out 8105 of redundant line card 810.

The effect of such switching is that downstream signal traffic for I/O card 845 will be sourced from redundant line card 810 and flow from RF Out 8105 over the Back-up Bus and pass-through I/O cards 825 and 835 on its way to I/O card 845. On I/O card 845, this downstream traffic is sent out over connector 8455. In a similar manner, any one of the other three designated as primary line cards 820, 830, and 850 may be decoupled from their respective I/O cards 825, 835 and 855, and coupled to the redundant line card 810 via the Back-up Bus if needed. Also, the topology shown allows for any one or more of the line cards shown to act as redundant line cards or primary line cards as needed. For instance, line card 820 could be designated as a redundant line card for line card 810 while line card 840 could be designated as a redundant line card for line card 830. Further, all five shown line cards could be simultaneously operational, if desired in the topology shown. Though only one downstream path is shown, all upstream and downstream connections on each card can be similarly configured to provide switching. At any time, as desired, a card designated redundant could become primary and vice-a-versa.

Figure 9:
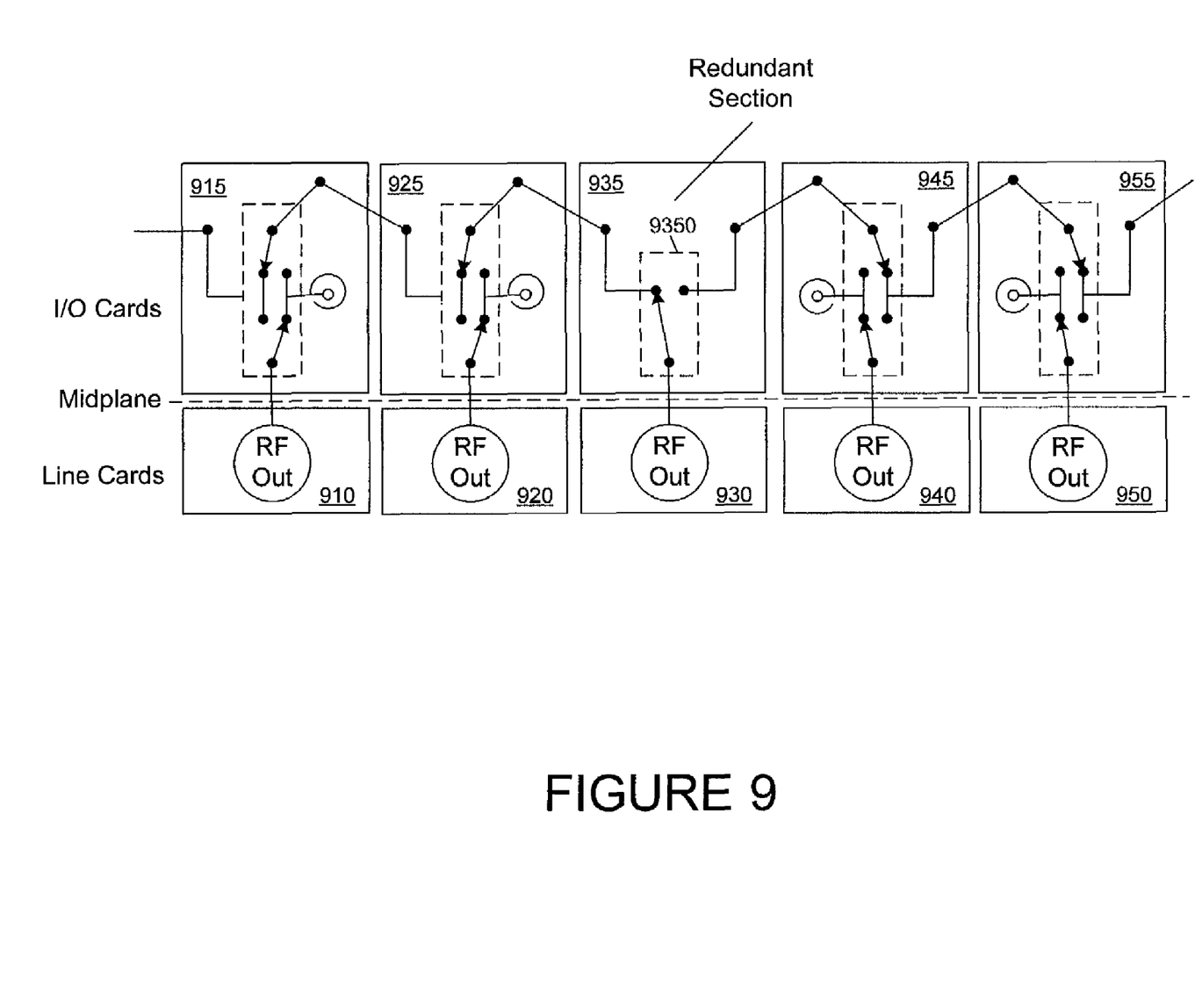
FIG. 9 shows yet another topology for redundancy switching to minimize RF connectivity length and attenuation.

FIG. 9 shows yet another topology for redundancy switching to minimize RF connectivity length and attenuation. In the topology shown, line card 930 is designated as common and centrally located redundant line card for line cards 910 and 920 as well line cards 940 and 950. This minimizes the worst-case length for which RF signals would have to travel over the Back-up Bus. Switch 9350 of spare card 935 would remain in the state shown in FIG. 9 if there were no primary line card failure/servicing, or if line cards 910 or 920 were to need servicing/replacement. The switch 9350 will change state from that shown in FIG. 9 if either line card 940 or 950 experience failure or need replacing or servicing. The spare card 930 is an I/O card unlike I/O cards 915, 925, 945 and 955 in that it needs "right" or "left" directional logic to implement redundancy. Further, in this configuration, the dedicated spare cannot be actively used while its redundancy capacity may be idle. An advantage of such a topology is that the problem of RF signal attenuation is minimized since the distance traveled along the back-up bus is minimized, on average.

Although the present invention has been described in detail with reference to the disclosed embodiments thereof, those skilled in the art will appreciate that various substitutions and modifications can be made to the examples described herein while remaining within the spirit and scope of the invention as defined in the appended claims. Also, the methodologies described may be implemented using any combination of software, specialized hardware, firmware or a combination thereof and built using ASICs, dedicated processors or other such electronic devices.

What is claimed is:

1. A system for redundancy switching of M primary line cards of a communications system, each of said primary line cards coupled to a corresponding primary I/O card, said system comprising:
  a switching fabric coupled to said primary I/O cards;
  N additional I/O cards coupled to said switching fabric, the primary I/O cards and the N additional I/O cards being connected in a daisy-chain fashion; and
  N redundant line cards, each said redundant line card coupled to a corresponding one of said additional I/O cards, wherein if any of said primary line cards is not operational, one of said redundant line cards is then coupled to the primary I/O card corresponding to said non-operational primary line card and said non-operational primary line card is de-coupled from its corresponding primary I/O card.

2. A system according to claim 1 wherein upstream and downstream traffic destined for and originating from said non-operational primary line card is re-routed from and through said redundant line card coupled to said primary I/O card corresponding to said non-operational primary line card.

3. A system according to claim 2 wherein each of said M primary I/O cards and said N additional I/O cards comprises a plurality of switching devices.

4. A system according to claim 3 wherein switching devices on said primary I/O card corresponding to said non-operational primary line card change state when redundancy switching is desired, and further wherein said switching devices on said additional I/O card corresponding to said redundant line card also change state when redundancy switching is desired.

5. A system according to claim 4 wherein the change of state of said switching devices on said primary I/O card cause decoupling of said non-operational primary line card from said primary I/O card and coupling of said primary I/O card with said redundant line card.

6. A system according to claim 4 wherein the change of state of said switching devices on said additional I/O card causes coupling of said primary I/O card with said redundant line card via said additional I/O card.

7. A system according to claim 3 wherein said switching devices are solid-state RF switches.

8. A system according to claim 2 wherein each said primary I/O card includes a plurality of upstream connectors to carry upstream traffic and a plurality of downstream connectors to carry downstream traffic.

9. A system according to claim 2 wherein each said additional I/O card includes a plurality of upstream connectors to carry upstream traffic and a plurality of downstream connectors to carry downstream traffic, and wherein said upstream and downstream connectors are not connected to a live signal path.

10. A system according to claim 1 wherein M is equal to N.

11. A system according to claim 1 wherein N equals one.

12. A system according to claim 1 wherein M is not equal to N.

13. A system according to claim 1 wherein said coupling of said redundant line card with said primary I/O card is achieved over a Back-up bus, said Back-up bus interconnecting all said primary I/O cards and additional I/O cards.

14. A system according to claim 13 wherein said Back-up Bus comprises a series of traces through a midplane.

15. A system according to claim 14 wherein said midplane is utilized to couple each primary line card to its corresponding primary I/O card.

16. A system according to claim 14 wherein said midplane is utilized to couple each redundant line card to its corresponding additional I/O card.

17. A system according to claim 1 wherein primary I/O cards are coupled to additional I/O cards via card-to-card jumpers.

18. A system according to claim 1 further comprising a midplane, said midplane utilized to couple each primary line card to its corresponding primary I/O card and to couple each additional I/O card to its corresponding redundant line card.

19. A system according to claim 18 wherein an array of pins of a connector connecting said primary I/O card to said primary line card is configured to simulate a coaxial cable.

20. A system according to claim 19 wherein said array includes a three by three array of pins, the center pin carrying an active signal and the other eight pins configured to provide grounding and shielding for said center pin.

21. A network device comprising:

a plurality of input/output (I/O) cards configured to receive and transmit radio frequency signals, the plurality of I/O cards being connected in a daisy-chain configuration, at least one of the plurality of I/O cards operating as a primary I/O card and at least one of the plurality of I/O cards operating as a backup I/O card; and a plurality of line cards, each line card connected to a different I/O card of the plurality of I/O cards, the line card connected to the at least one backup I/O card operating as a backup line card.

22. The network device of claim 21 wherein the primary I/O card is configured to:

switch, when the line card with which the primary I/O card is connected fails, traffic for the failed line card to the backup line card.

23. A network device comprising:

a plurality of primary input/output (I/O) cards configured to receive and transmit radio frequency signals;

at least one backup I/O card, the plurality of primary I/O cards and the backup card being connected in a daisy-chain configuration;

a plurality of primary line cards, each line card associated with a different primary I/O card; and at least one backup line card associated with the at least one backup I/O card.

24. The network device of claim 23 wherein each primary I/O card is configured to:

transfer, when the primary line card with which the primary I/O card is associated fails, traffic to or from the failed primary line card to or from the at least one backup line card.

25. The network device of claim 24 wherein the transfer causes traffic to traverse at least one other primary I/O card.

* * * * *